UNITED STATES PATENT OFFICE.

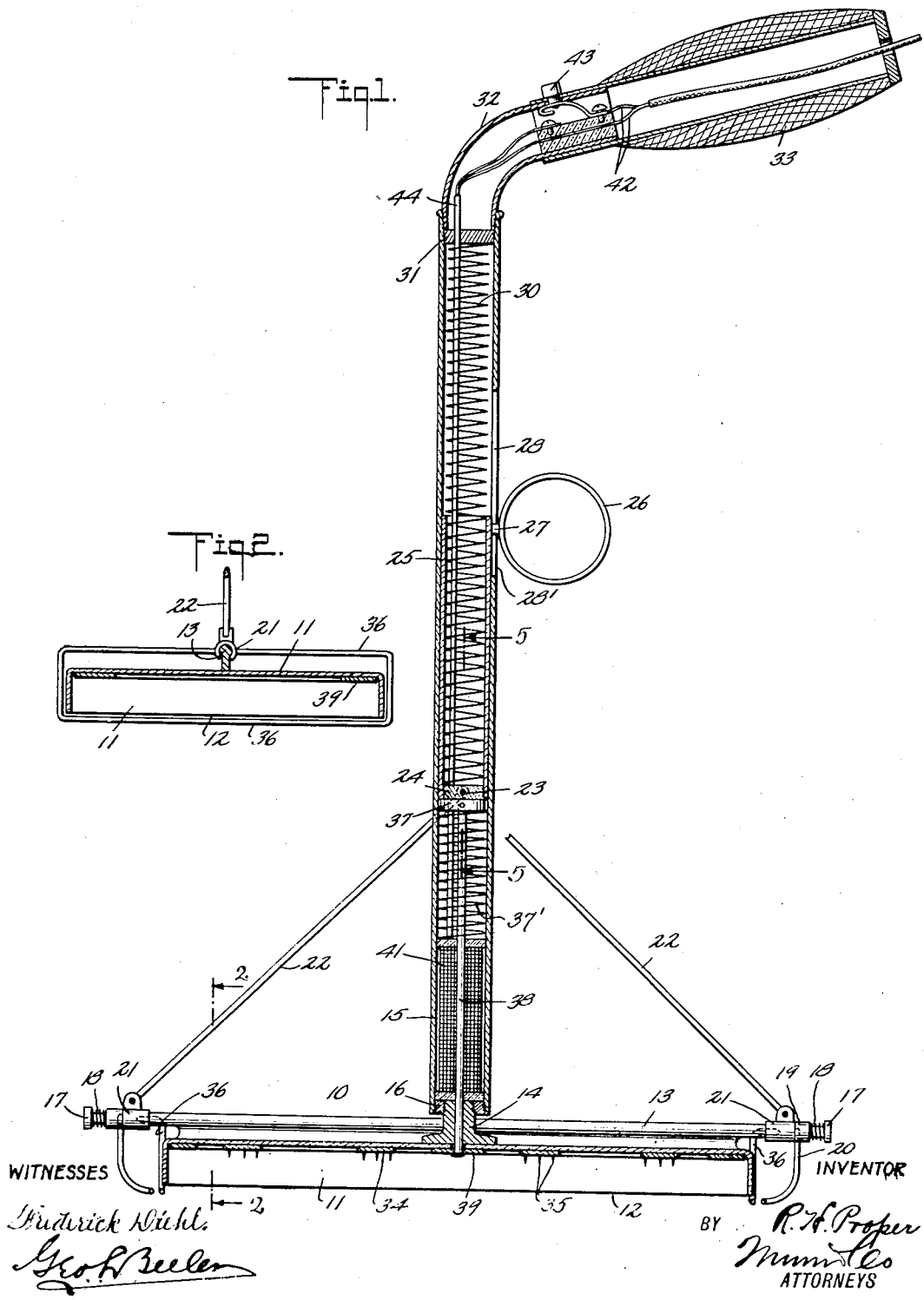

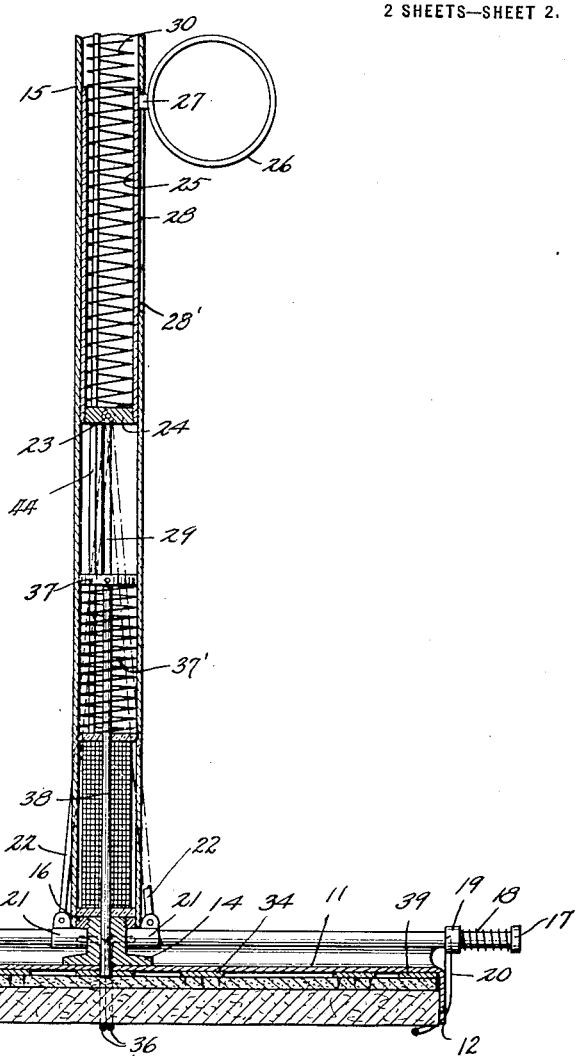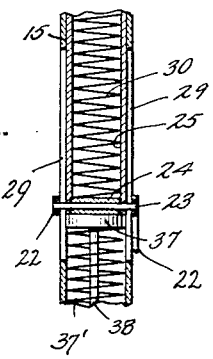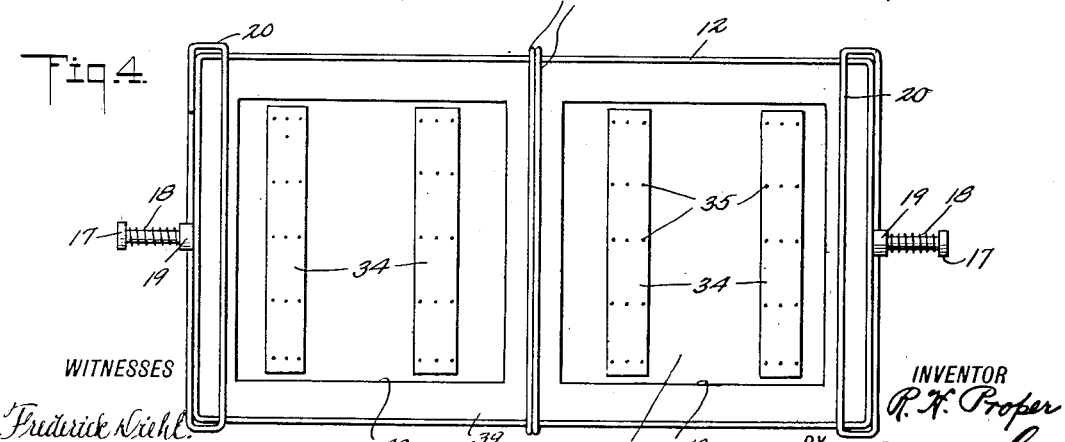

RUSSELL H. PROPER, OF NEW YORK, N. Y.

ICE-CREAM-SANDWICH MACHINE.

1,387,613.  Specification of Letters Patent.  Patented Aug. 16, 1921.

Application filed April 2, 1920. Serial No. 370,736.

*To all whom it may concern:*

Be it known that I, RUSSELL H. PROPER, a citizen of the United States, and a resident of the city of New York, borough of Manhattan, in the county and State of New York, have invented a new and Improved Ice-Cream-Sandwich Machine, of which the following is a full, clear, and exact description.

This invention relates to ice cream apparatus or devices for delivering ice cream or similar frozen commodities from a container in the form of sandwiches or the like.

Among the objects of the invention is to provide a simple hand operated utensil adapted to be plunged into a container of ice cream, carrying with it one biscuit, and so designed as to receive a film of ice cream of suitable thickness to constitute the filler between a biscuit and a second biscuit that will be applied to the face of the film of cream after the device is withdrawn from the container.

Another object of the invention is to provide a device of the nature indicated that will be simple in construction and rapid and efficient in operation, and one which from its nature will not be likely to get out of order or be criticized on sanitary grounds.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a vertical sectional view of a preferred embodiment of my invention, the parts being in normal position as when plunged into a mass of cream.

Fig. 2 is a vertical transverse sectional detail on the line 2—2 of Fig. 1.

Fig. 3 is a view corresponding to the principal parts of Fig. 1, but with the ice cream cutter devices moved to their opposite position and with a film of cream severed from the mass and carried upward from the container.

Fig. 4 is a bottom plan view of the device with the parts in the position of Fig. 3, but with the ice cream and biscuit omitted.

Fig. 5 is a vertical transverse sectional detail on the line 5—5 of Fig. 1.

10 indicates as a whole a body having a mold 11 of suitable length and breadth to correspond to the dimensions of an ice cream biscuit B, and of sufficient depth to accommodate a film or filler of ice cream C and upon the face of which after being withdrawn from the mass of cream a second biscuit, not shown, will be applied to complete the sandwich. It will be understood that the mold comprises a flat main bottom portion and a bounding flange or periphery, the free edge of which is indicated at 12 and occupying a single plane parallel to the bottom. The mold is fixed to a rib portion 13 which constitutes a stiffener for the mold and the other main portion of the body 10. 14 indicates a head at the center of the body and constituting a means for attachment of a shank 15 of tubular form, the connection being made through a coupling nut 16 threaded to the head and within the lower end of the shank tube.

The ends of the rib 13 are extended beyond the mold and terminate in heads 17 adjacent to each of which is an expansion spring 18 bearing at its inner end against a keeper 19. The keeper includes a bail 20 connected to the keeper collar and extending laterally therefrom thence downward and thence inward so as to pass over the adjacent end of the mold to the position shown in Fig. 3 to retain the end portion of the filler of cream during the extraction of the device from the mass of cream.

Any suitable key means may be provided to prevent rotation of the keeper on the extension of the rib, or said extension may be of angular form for this purpose.

The keepers are held normally spaced outward from the mold, as shown in Fig. 1, by means of runners 21 slidable toward and from each other along the rib 13. The normal position of the runners is as shown in Fig. 1. To each of the runners is attached a rod or wire 22, the upper end of which is pivoted at 23 to the lower end 24 of a plunger 25 to which is connected a finger piece 26, the connection being through a neck 27 projecting through and slidable lengthwise in a slot 28 formed in the shank tube 15. The pivots 23 project laterally through other slots 29 formed in the shank tube. These sliding parts are held therefore from rotation around the axis of the shank by virtue of the slots. An expansion spring 30 is located in the upper portion of the shank and bears at its lower end against a plunger head 24 and at its upper end against a stationary plug 31 adjacent to which is connected a goose neck portion 32 of the handle 33. The normal tendency of this spring 30 is to hold the plunger down as shown in Fig. 1 and therefore the runners 21 outward holding the keepers outward against the force of the springs 18.

Secured to the inner face of the mold bottom are a plurality of plates 34 each carrying a multiplicity of prongs 35 upon which the first biscuit B is impaled and whereby said biscuit is held snugly until the device is plunged into the mass of cream. From the foregoing partial description of the mechanism the operation will be understood as follows: The operator grasping the grip 33 in one hand will apply the biscuit B to the prongs 35 with his other hand and then the device will be plunged directly downward into the mass of cream. The operator then while grasping the hand grip 33 will draw upward with one finger on the ring 26 bringing upward the plunger as indicated in the position of Fig. 3 and causing thereby the runners 21 to approach each other at or toward the head 14. Each of the runners carries a cutter 36 similar in general construction to the keepers 20, but not being bent toward each other at their bottoms as are the keepers 20. In other words the cutters 36 are adapted to strike against each other at the center of the device as shown in Figs. 3 and 4, and with the device held in this position it will be withdrawn from the mass of cream carrying with it the portion or film C as indicated. The cutters 36 sweep across the free edge 12 of the mold and cut the portion C free from the mass in the container. Furthermore in this position the cutters support the central portion of the film and biscuit, while the keepers support the end portions, during the withdrawal from the container. Since the cutters have already served their purpose of severing the sandwich film or filler from the bulk of the ice cream and the end and side portions thereof are guarded by the mold flange there is no tendency for the biscuit B or the sandwich portion of cream to be delivered prematurely from the mold. After the delivery from the bulk of ice cream the device is turned over and the plunger is released so that it may assume its normal position as in Fig. 1 and with the keepers and cutters clear of the face of the film so that the second biscuit may be applied directly thereto completing the sandwich. The operator then gives a thrust upon the finger piece from the grip and against a spring 37', as will be permitted by the slot extension 28' causing the plunger head 24 to bear against the head 37 of the ejector comprising a rod 38 to one end of which the head 37 is attached and to the other end of which the ejector plate 39 is attached. This plate 39 is provided with large openings 40 which normally surround the plates and prongs 34 and 35, but the imperforate portions of the plate 39 are sufficiently extensive to eject the sandwich from the mold without any danger of breaking it.

When operating in very stiff cream it is sometimes desirable to warm the device slightly so as to facilitate the action of the movable parts. To this end I show at 41 an electrical heating device in the nature of a resistance coil located in the lower end of the shank 15 adjacent to the coupling nut 16. The circuit wires 42 leading to this coil are shown as extending through the hollow grip 33, and adjacent to the grip is a normally open switch at 43 adapted to be closed whenever desired to warm the device by the pressure of the operator's thumb. Within the shank the wires are guarded by a casing 44 which may be stiff if necessary to protect the wires from abrasion due to the movable plunger and ejector devices.

I claim:

1. A device for making ice cream sandwiches comprising a mold, means to manipulate the mold into and out of a mass of ice cream, said mold being adapted to receive first an ice cream biscuit against one face of which a film of ice cream is received and delivered in the mold from the mass, and means movable over the biscuit and ice cream film to retain the same within the mold during the withdrawal of the device from the mass.

2. A device as set forth in claim 1 in which the means for holding the film of ice cream includes a pair of keepers movable from points beyond the mold to positions across the face of the mold.

3. A device as set forth in claim 2 in which automatic means is provided to move the keepers into the last mentioned position.

4. A device as set forth in claim 3 including cutters to sever a film of cream from the mass, and means to move the cutters outward to clear the face of the mold for removal of the sandwich from the mold.

5. A device as set forth in claim 4 in which the cutting devices act automatically to withdraw the keepers from their holding position.

RUSSELL H. PROPER.